(12) United States Patent
Vito (10) Patent No.: US 9,030,603 B1
(45) Date of Patent: May 12, 2015

(54) FOLDABLE PROMPTING APPARATUS

(71) Applicant: Promptbox International LLC, San Rafael, CA (US)

(72) Inventor: Linda Vito, San Rafael, CA (US)

(*) Notice: Subject to any disclaimer, the term of this patent is extended or adjusted under 35 U.S.C. 154(b) by 0 days.

(21) Appl. No.: 14/218,745

(22) Filed: Mar. 18, 2014

Related U.S. Application Data (63) Continuation-in-part of application No. 13/934,231, filed on Jul. 3, 2013.

(51) Int. Cl.
*H04N 5/222* (2006.01)
*H04N 5/225* (2006.01)

(52) U.S. Cl.
CPC ........... *H04N 5/2222* (2013.01); *H04N 5/2252* (2013.01)

(58) Field of Classification Search
CPC ... H04N 5/2251; H04N 5/222; H04N 5/2252; H04N 9/646
USPC ............. 348/375, 722, 373, 61, 14.01, 14.06, 348/14.08; 353/119, 122, 103, 113; 396/1
See application file for complete search history.

(56) References Cited

U.S. PATENT DOCUMENTS

| | | | | |
|---|---|---|---|---|
| 6,104,424 | A * | 8/2000 | McNelley | 348/14.16 |
| 6,243,130 | B1 * | 6/2001 | McNelley et al. | 725/105 |
| 6,280,039 | B1 * | 8/2001 | Barber | 353/119 |
| 6,717,619 | B2 * | 4/2004 | Wasada | 348/375 |
| 6,980,253 | B1 * | 12/2005 | Matsui | 348/375 |
| 2009/0256970 | A1 * | 10/2009 | Bilbrey et al. | 348/722 |
| 2010/0182513 | A1 * | 7/2010 | DeOtte | 348/722 |

* cited by examiner

*Primary Examiner* — Nhan T Tran
*Assistant Examiner* — Chan Nguyen
(74) *Attorney, Agent, or Firm* — Dahyee Law Group; Leon E. Jew (57) ABSTRACT

The invention provides a prompting apparatus comprising a foldable prompting box which includes two symmetrical opposite walls which can be open and closed, a bottom board which can be folded up and released, and a rear wall, which jointly define a space for housing a two-way see-through mirror and the lens of the camera. The cover defines a space for a user to slide in a tablet device which runs a prompting software application. The pre-designed text is displayed on the tablet device's screen at a speed that the speaker feels comfortable to read. When the apparatus is not in use, the prompting box can be easily folded into a flat compact for the user's convenience to carry.

6 Claims, 13 Drawing Sheets

FOLDABLE PROMPTING APPARATUS

CROSS REFERENCE TO RELATED APPLICATION

This application is a continuation-in-part of, and claims the benefit of priority to, the U.S. patent application Ser. No. 13/934,231 entitled "PROMPTING APPARATUS" filed on Jul. 3, 2013, the content of which is incorporated in its entirety by reference herein.

FIELD OF THE INVENTION

This invention generally relates to an autocue displaying device that prompts a person speaking with an electronic visual text of a speech or script. In particular, this invention relates to a prompting apparatus including a foldable box which allows a user to use a tablet device as the apparatus' display, and a mounting assembly which allows the user to couple the box with a video camera or a camcorder by steps which are as simple as loosening and fastening few fasteners.

BACKGROUND OF THE INVENTION

A teleprompter is an assembly which enables on-camera talent to look directly into the lens of the camera and read a prepared script text that is generated by a computer software application that allows scrolling up of the text so the reader can keep up with the up-coming text as she reads aloud. The reader sees the text reflected from a two-way mirror and the audience can only sees the scene being shot by the camera through the two-way mirror.

Such type of prompters evolved from the days of cathode ray TV tube displays. As a result, they were heavy off-camera devices that had to be mounted below the front of the camera on a "sled" between the camera and the camera pan and tilt head, which is then mounted on a tripod. Typically these prompters were heavy and time-consuming to mount and operate. Usually it takes a professional about 30 minutes to set-up, align, balance and trim and connect to a personal computer.

With the availability of small size, low-cost and light-weight LCD displays and tablet devices, it is now possible to design and build a prompter that is lightweight, mounts in a more industry standard manner and is very quick to mount, set-up and use.

It is an object of the present invention to provide a simple, lightweight, compact yet effective prompting apparatus that enables a speaker to look directing into a camera's lens which is hidden behind a prompting mirror and invisible to the speaker, and at the same time read the textual or other information shown on the prompting mirror, and that can be easily coupled with a video camera or a camcorder which has an accessory adapter shoe on its top.

It is a further object of the present invention to provide a prompting apparatus with a shrouded chamber immediately behind an inclined prompting mirror and the camera's lens is positioned in the chamber and behind the mirror such that unwanted light is blocked from entering the camera's lens and the best quality of the recorded images by the camera can be reached.

It is a still further object of the present invention to provide a prompting apparatus using a tablet device facing down to the prompting mirror, which is positioned at a 45 degree angle to the display screen of the tablet device, such that unwanted light from the light sources above the apparatus can be blocked from directly shining on the display screen.

It is an additional object of the present invention to provide a prompting apparatus with a foldable housing, which can be conveniently pop-up for use and can be conveniently folded into a package when not in use. When the housing is popped-up, the tablet can be conveniently positioned as a ceiling facing down to the prompting mirror, which is positioned at a 45 degree angle to the tablet device's display screen, such that the interference on the display screen and the prompting mirror caused by unwanted light is minimized and the clarity of the images on the prompting mirror viewed by the speaker is maximized.

It is yet another object of the present invention to provide a mounting and adjustment assembly which enables a user to couple the prompting apparatus to a video camera or a camcorder which has an accessory adapter shoe on its top.

SUMMARY OF THE INVENTION

The foldable apparatus according to this invention includes a foldable prompter unit and a mounting and adjusting assembly for coupling the prompter unit to a video camera or a camcorder, herein after referred to as a camera, which has an accessory adapter shoe, usually called accessory shoe, on its top.

The prompter unit, also called prompting box, includes a housing, an inclined two-way see-through mirror which is placed in the inner space of the housing, and a tablet device which is placed at the top of the box with its display screen facing toward the mirror. The housing includes an open front, two opposite shrouding walls, a shrouding bottom, a rear shrouding wall and a member for holding a tablet device facing down to the mirror. The rear shrouding wall has a round opening, or called through-hole, for placing the camera's lens.

The tablet device's display screen is preferably at 45 degree angle to the two-way see-through mirror. The see-through mirror, which is approximately 40-60% reflective and 30-40% transparent, is held in position at a 45 degree angle to the screen surface of the tablet device. The optical image on the tablet device's display screen is reflected to the two-way see-through mirror and then reflected to the eyes of a speaker who looks into the mirror. The lens of the camera is placed in the space behind the mirror. Because of reflection, only the images from the speaker's direction may enter the lens, and the images from the tablet's screen cannot be captured by the lens.

The see-through mirror is detachable. When it is detached from the housing, the two opposite shrouding walls can be folded inwardly one after another and the bottom can be folded up, such that the box is folded into a flat compact for carrying convenience.

BRIEF DESCRIPTION OF THE DRAWINGS

FIG. 2 is a schematic diagram illustrating a perspective view of the prompting apparatus according to FIG. 1 when the cover is partially opened so that a tablet can be slid in;

DETAILED DESCRIPTION OF THE INVENTION

While the present invention may be embodied in many different shapes, forms, designs or configurations, for the purpose of promoting an understanding of the principles of the invention, reference will be made to the embodiments illustrated in the drawings and specific language will be used to describe the same. It will nevertheless be understood that no limitation of the scope of the invention is thereby intended. Any alterations and further implementations of the principle, the essence or the spirit of the invention as described herein are contemplated as would normally occur to one skilled in the art to which the invention relates.

The present invention discloses and teaches a prompting apparatus for coupling with a camera for video recording which has an accessory adapter shoe on its top. The apparatus includes (1) a rectangular housing with an open front defined by a pair of symmetrical opposite side walls which are parallel to each other, a bottom which is typically a flat board, and a rear wall with a round opening for positioning and aligning the camera's lens; (2) a flat see-through mirror being fittingly placed in the housing with its upper edge being operably coupled to the top edge of the rear wall or the upper portions of the side walls, its lower edge being placed against the front edge of the bottom such that the see-through mirror, the side walls, the bottom and the rear wall forming a chamber wherein the lens is positioned and aligned behind the see-through mirror; (3) a cover operably coupled to the side walls through two pairs of fastening means such as bolts, the cover and the side walls defining a space for holding a tablet device with its screen facing down at an angle of approximately 45 degrees from the see-through mirror and in operation, image on the screen being reflected by the see-through mirror to a speaker's eyes seeing into the see-through mirror while light from the speaker passing through the see-through mirror into the lens; and (4) a mounting and adjusting hardware assembly for coupling the housing with the camera through the accessory adapter shoe. In operation, the speaker can only see the text reflected by the mirror but cannot see the lens hiding behind the mirror. Similarly, the camera can only capture the images in front of the mirror but cannot capture the text reflected from the tablet device's screen.

The left side wall is operably coupled to the rear wall's left side via a first hinging means such as one or a pair of small hinges and the right side wall is operably coupled to the rear wall's right side via a second hinging means, such as one or a pair of small hinges. Each of the opposite side walls has a narrow shoulder toward inside for supporting the tablet device. The narrow shoulder is a strip bent from the side wall. The purpose of the narrow shoulders is to support the tablet device, or optionally support a piece of flat glass which supports the tablet device.

The bottom includes two coupling means located at the rear end. The coupling means such as a bold and nut enables the bottom board to be folded up after the two side walls are folded inward. In a typical embodiment, the bottom includes a pair of symmetrical opposite wings, and each wing has a coupling means, such as a bolt, at its rear end for coupling the bottom to the rear wall's vertical side or a frame.

Figure 1:
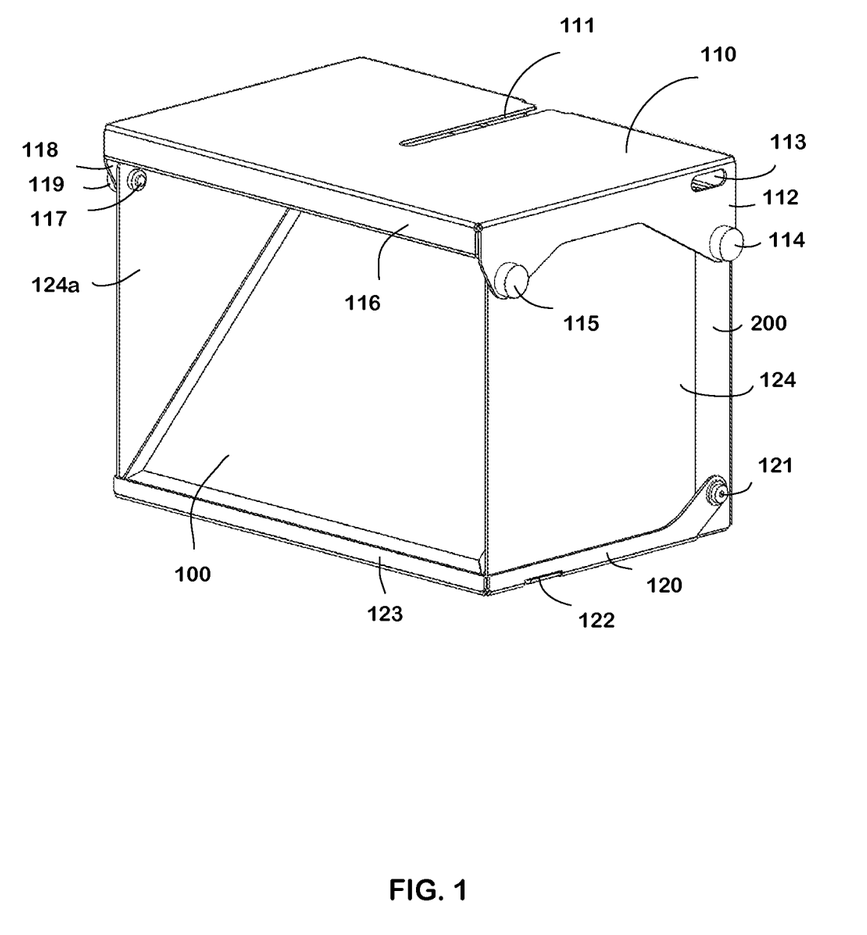
FIG. 1 is a schematic diagram illustrating a perspective view of a typical embodiment of the prompting apparatus according to the present invention.
Figure 2:
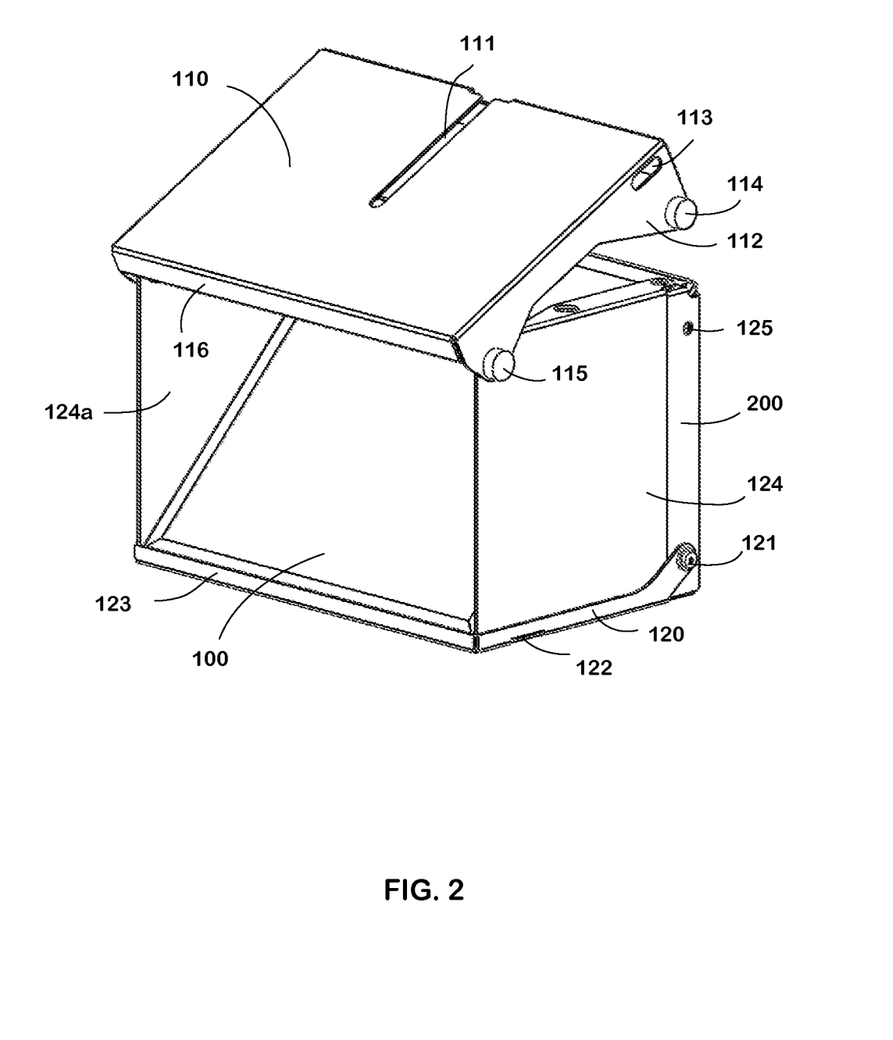

FIG. 1 illustrates a perspective view of a typical preferred embodiment of the prompting box according to the present invention. FIG. 2 is a schematic diagram illustrating the prompting apparatus according to FIG. 1 when the cover is partially opened so that a tablet device can be slid in. The apparatus includes two symmetrical opposite side walls 124 and 124a which are parallel to each other, a bottom board with front edge 123, a see-through mirror 100, and a cover 110.

The cover 110 includes an adapting groove or slot 111 for coupling the box with a camera through a mounting and adjusting assembly. The cover 110 is coupled to the side walls 124 and 124a by two pairs of bolts such as 114, 115 and 119 shown in FIG. 1. The cover 110 may also include a slot such as the opening 113 on each side for the user's convenience to operate the tablet device which is placed under the cover 110.

The bottom board's side wing 120 is adapted to the rear wall's side frame 200 through a pair of coupling means such as a bolt 121.

Figure 3:
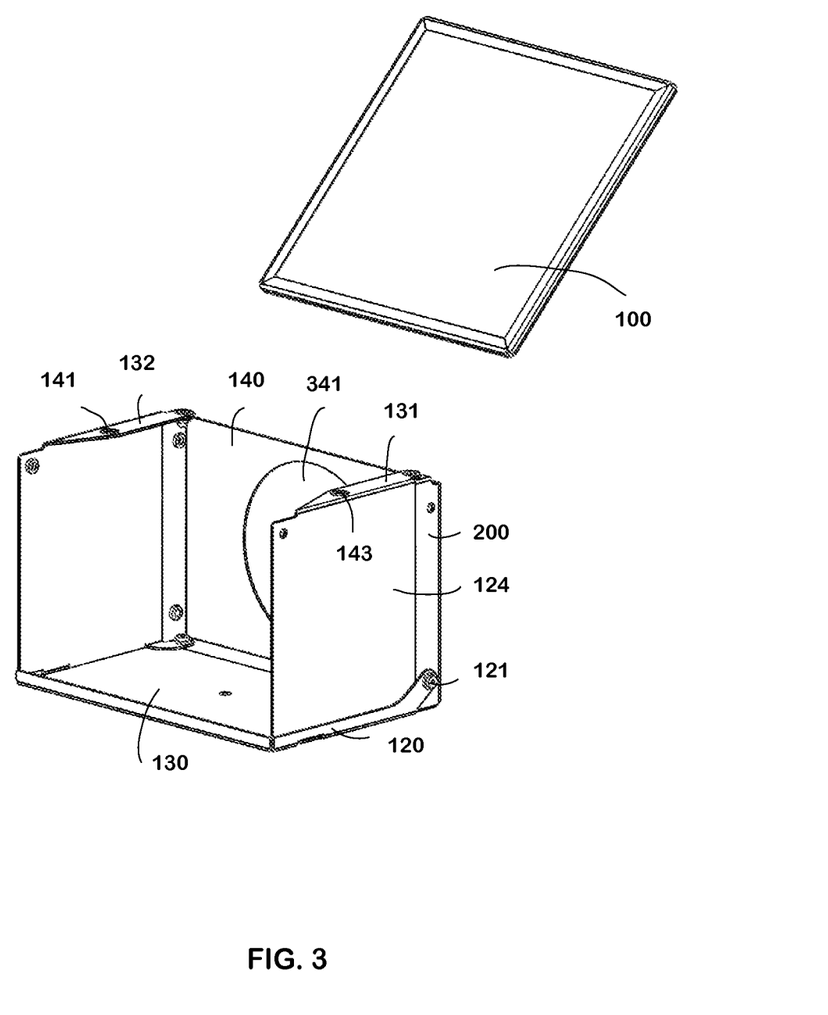
FIG. 3 is a schematic diagram illustrating a perspective view of the housing of the prompting apparatus according to FIG. 1 when the see-through mirror is detached from the housing.

The inclined two-way mirror 100 is a see-through mirror with an optical grade of approximately 60-70% reflective and approximately 30-40% transparent. It is held in position at a 45 degree angle to the display screen of the tablet which is placed inside the space defined by the cover 110 and the two symmetrical side walls' shoulders 131 and 132 shown in FIG. 3 which is a schematic diagram illustrating a perspective view of the housing of the prompting box according to FIG. 1 when the see-through mirror 100 is detached from the housing. The shoulder can a strip bent from the same piece of material of the side wall or a strip of different material vertically welded to the side wall.

Figure 4:
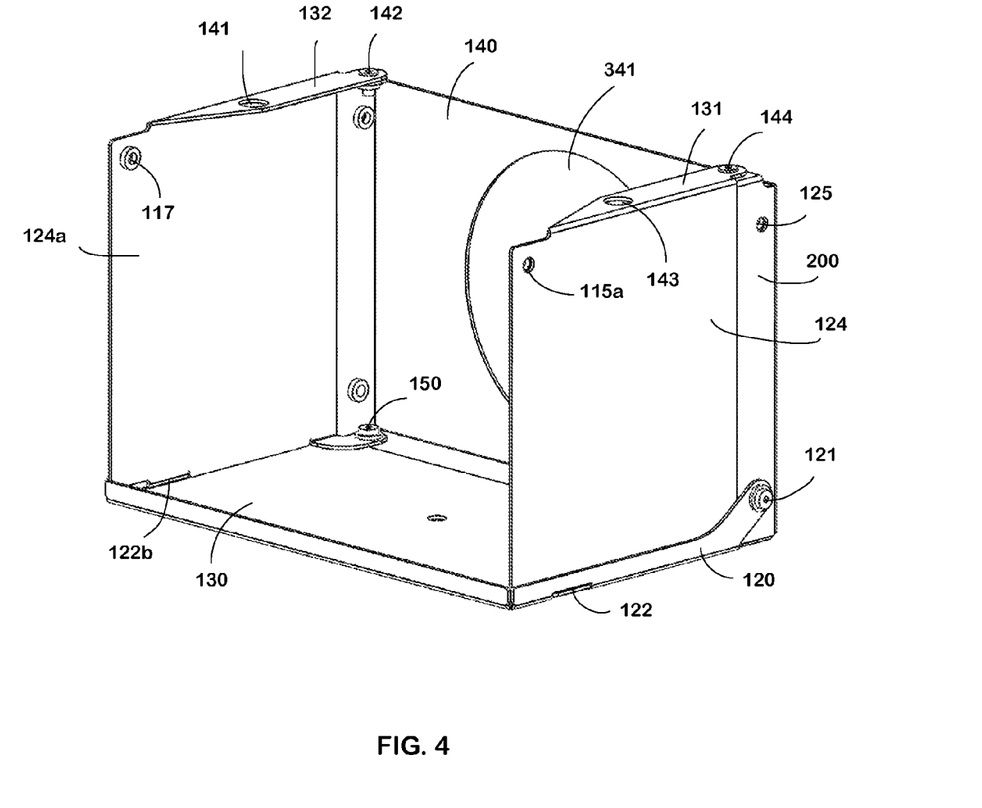
FIG. 4 is a schematic diagram illustrating a perspective view of the housing of the prompting box according to FIG. 1.

FIG. 4 is a schematic diagram illustrating a perspective view of the housing of the prompting box according to FIG. 1. The side wall 124 can be folded inward through a pair of bolts and nuts such as bolt 144 on the upper portion. The bottom board 130 has a pair of symmetrical opposite wings such as the right wing 120, which is a strip of metal or plastic or other solid material vertical to the bottom board. The right wing 120 has a female member 122 in its front portion. The side wall can be coupled to the wing by coupling a male member located at the lower front portion of the side wall to the female member on the wing. The right wing 120 is coupled to the support frame 200 of the rear wall 140 through a hinging means such as a bolt and nut 121.

Figure 5:
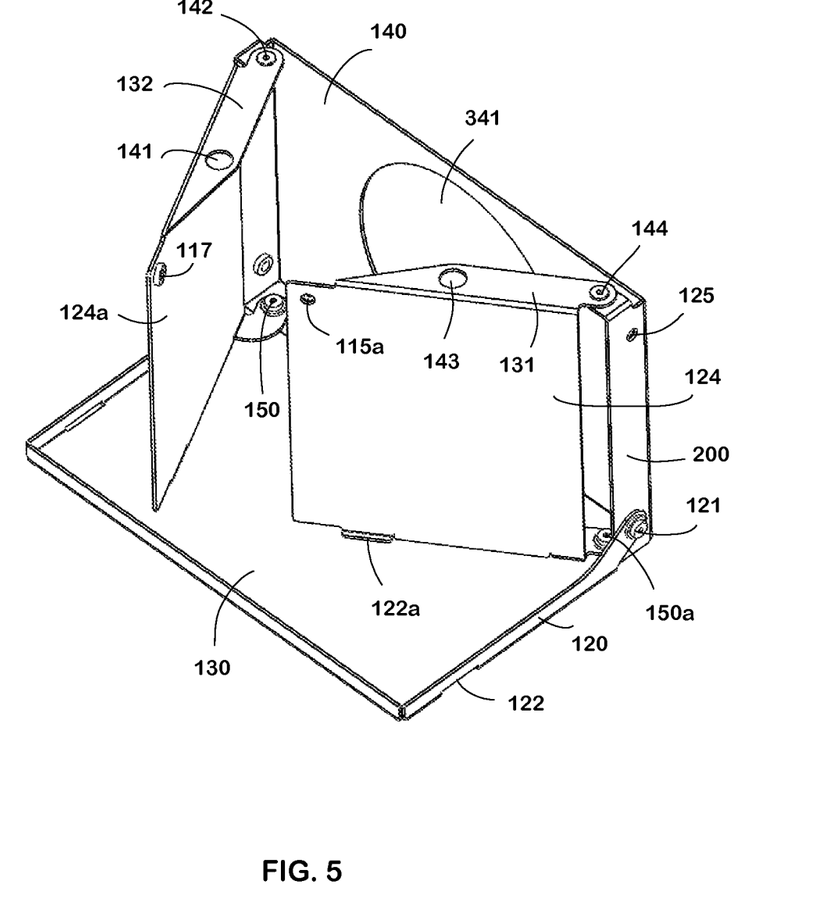
FIG. 5 is a schematic diagram illustrating the side walls of the housing being folded inwardly.
Figure 6:
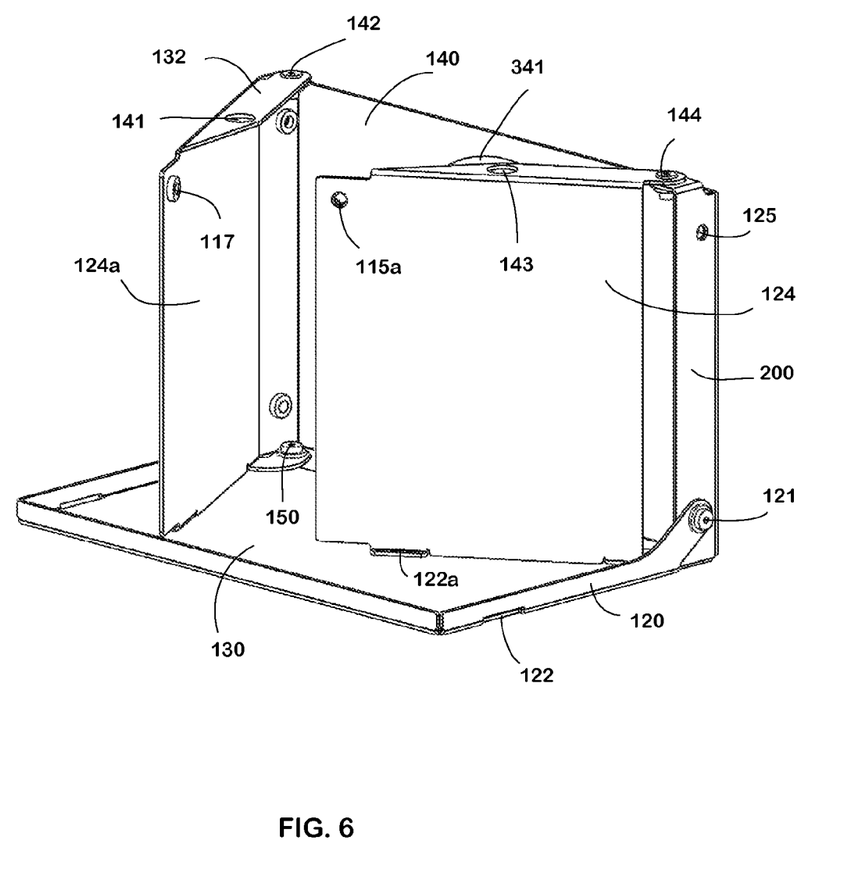
FIG. 6 is a schematic diagram illustrating another perspective of FIG. 5.

FIG. 5 and FIG. 6 are schematic diagrams illustrating the side walls of the housing being folded inwardly. When the right side wall 124 is turned inward by the hinging means 144 and 150a, the male member 122a on the lower front portion of the right side wall 124 is separated from the female member 122. As mentioned above, the left side wall 124a is symmetrical to the right side wall 124.

Figure 7:
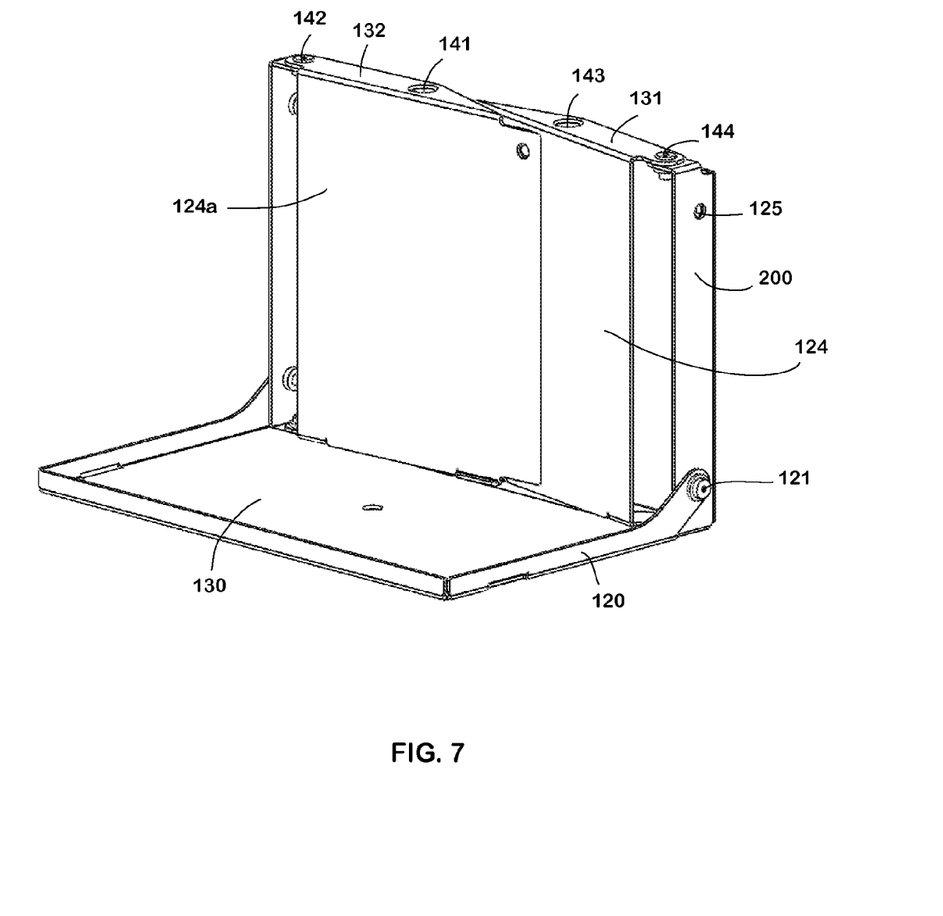
FIG. 7 is a schematic diagram illustrating the side walls of the housing having been fully folded.
Figure 7A:
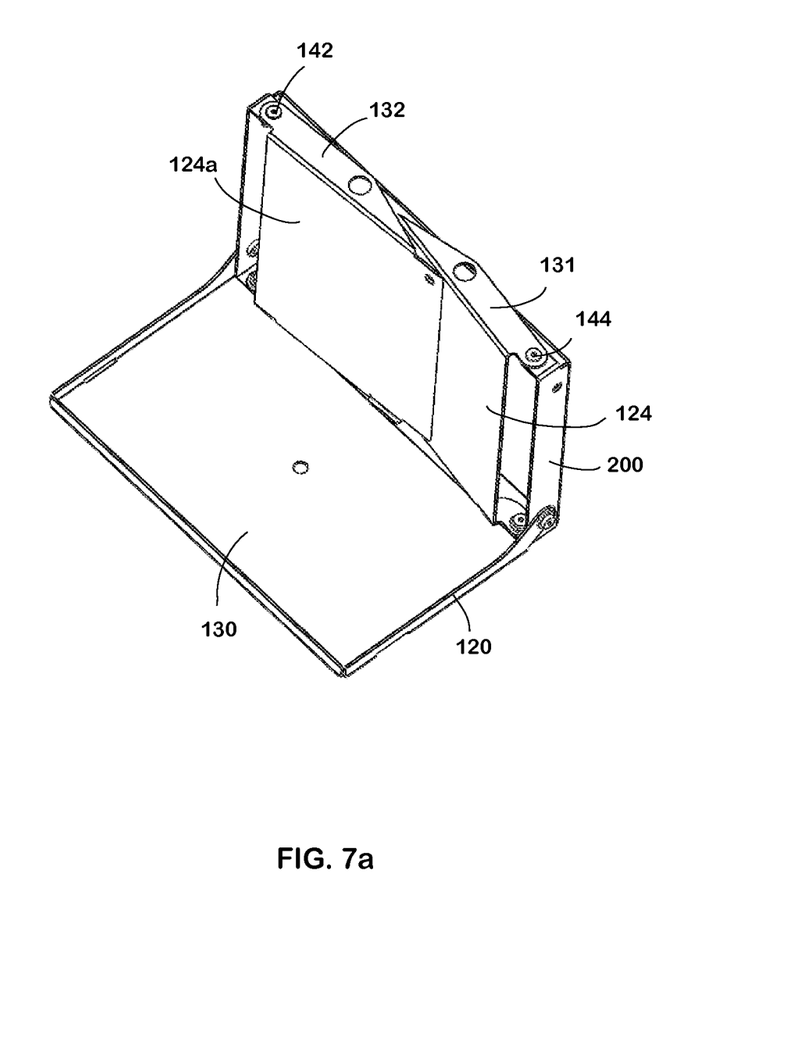
FIG. 7a is a schematic diagram illustrating another perspective of FIG. 7.

FIG. 7 and FIG. 7a are schematic diagrams illustrating the side walls of the housing having been fully folded. When both right and left side walls 124 and 124a are folded, bottom board 130 can be folded up by the hinging means such as the bolt and nut 121 on the right wing 120 and the corresponding member on the left wing.

Figure 7B:
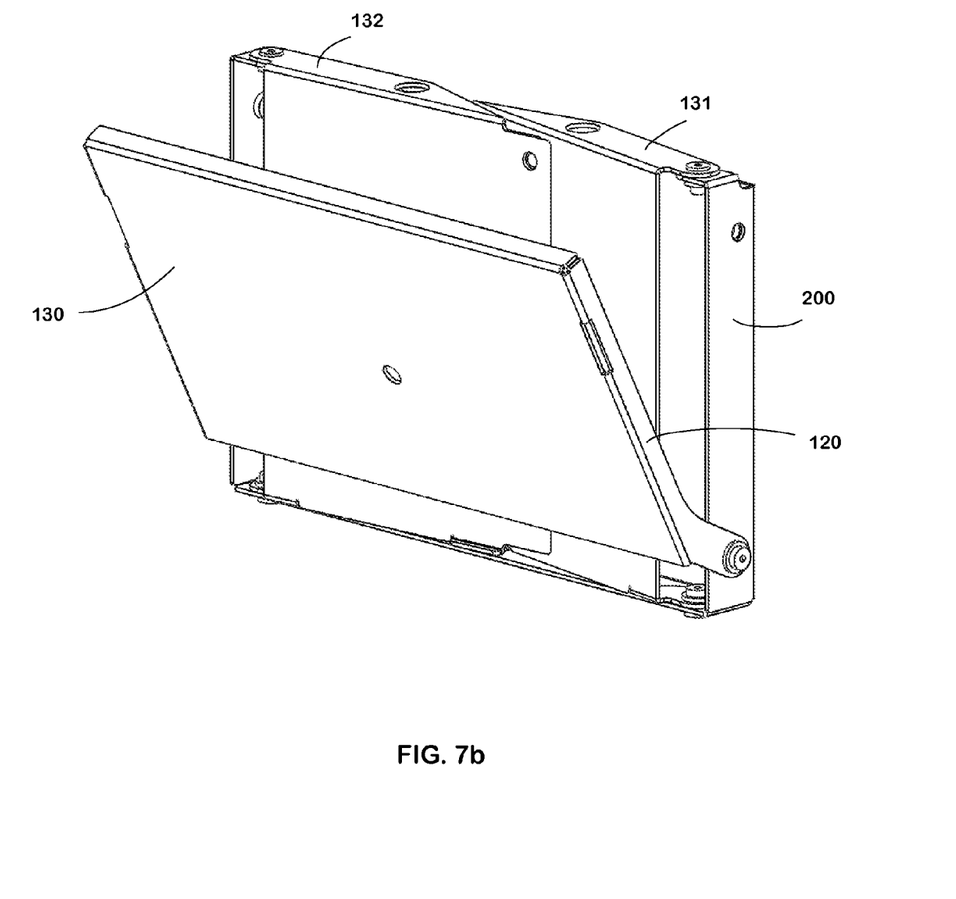
FIG. 7b is a schematic diagram illustrating the bottom of the housing being folded up.
Figure 7C:
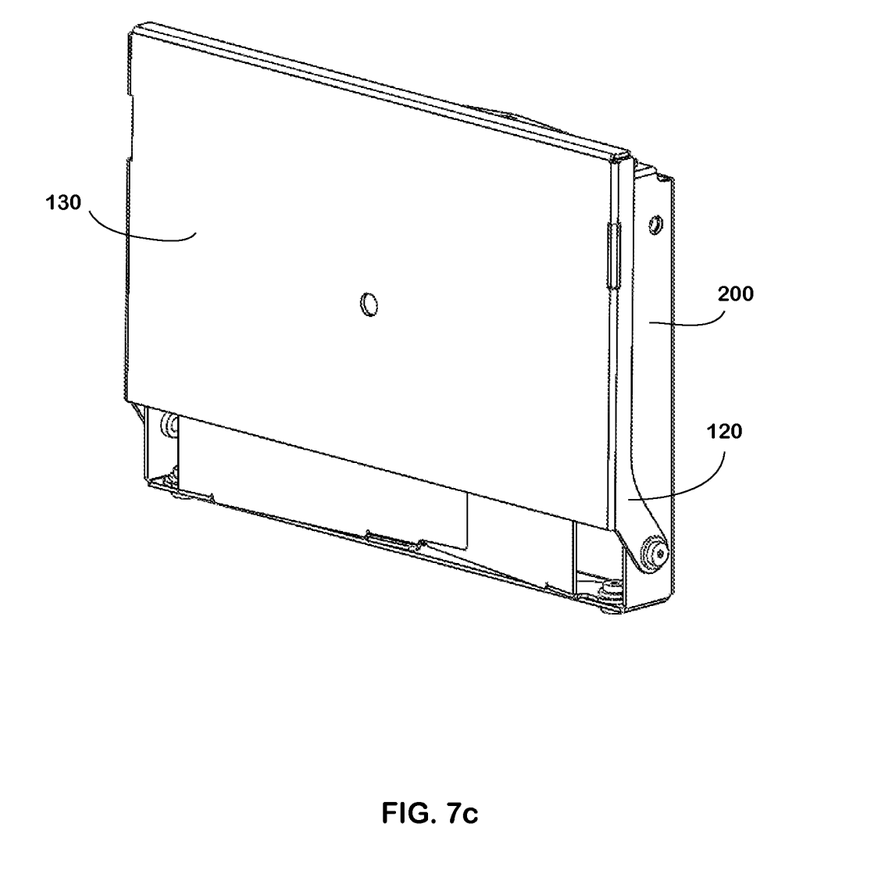
FIG. 7c is a schematic diagram illustrating the bottom of the housing having been fully folded up.

FIG. 7b is a schematic diagram illustrating the bottom of the housing being folded up. FIG. 7c is a schematic diagram illustrating the bottom of the housing having been fully folded up. The side walls 124/124a and the bottom board 130 are fittingly integrated as a flat compact.

Referring back to FIG. 3-FIG. 7, the right wall 124 has a shoulder 131 which is vertical to the right wall 124. On the shoulder 131, there is a female member 143 which is for fastening a glass connector, such as a rubber sucker. The right wall 124a has a shoulder 132 which is vertical to the left wall 124a. On the shoulder 132, there is a female member 141 which is for fastening a glass connector, such as a rubber sucker. When the box is fully spread as illustrated in FIG. 4, i.e. when the bottom board 130 is released to the position vertical to the real wall 140, the right side wall 124 is released to the position vertical to the rear wall 140, the left side wall 124a is released to the position vertical to the rear wall 140, a piece of flat glass can be placed in the plane defined by the connectors 141/143 and the members 142/144.

Figure 8:
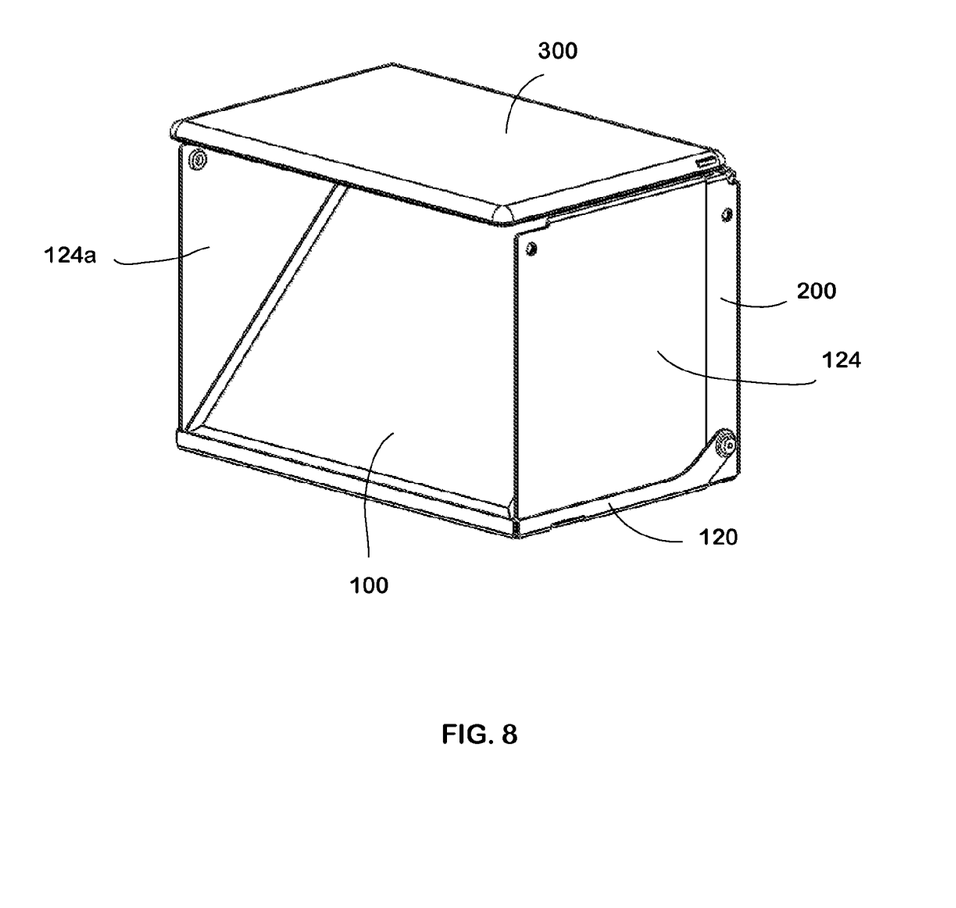
FIG. 8 is a schematic diagram illustrating a smaller size tablet being coupled with the apparatus.

In operation, the piece of glass is optional. If the longest measurement of a tablet such as mobile phone is narrower than the distance between the side walls 124/124a, the flat glass is needed. In that case, the mobile phone is placed on the flat glass, facing down to the bottom board 130, and then it is fastened after the cover 110 (referring to FIG. 1-FIG. 2) is closed. However, if the two-dimensional measurement of the tablet is approximately same as the two-dimensional measurement of the top view of the box as illustrated in FIG. 8, the flat glass is not necessary. In that case, the tablet 300 is placed facing down to the bottom board 130. It was supported by the side walls' shoulders. After the cover 110 (referring to FIG. 1-FIG. 2) is closed, the tablet is fastened.

Figure 9:
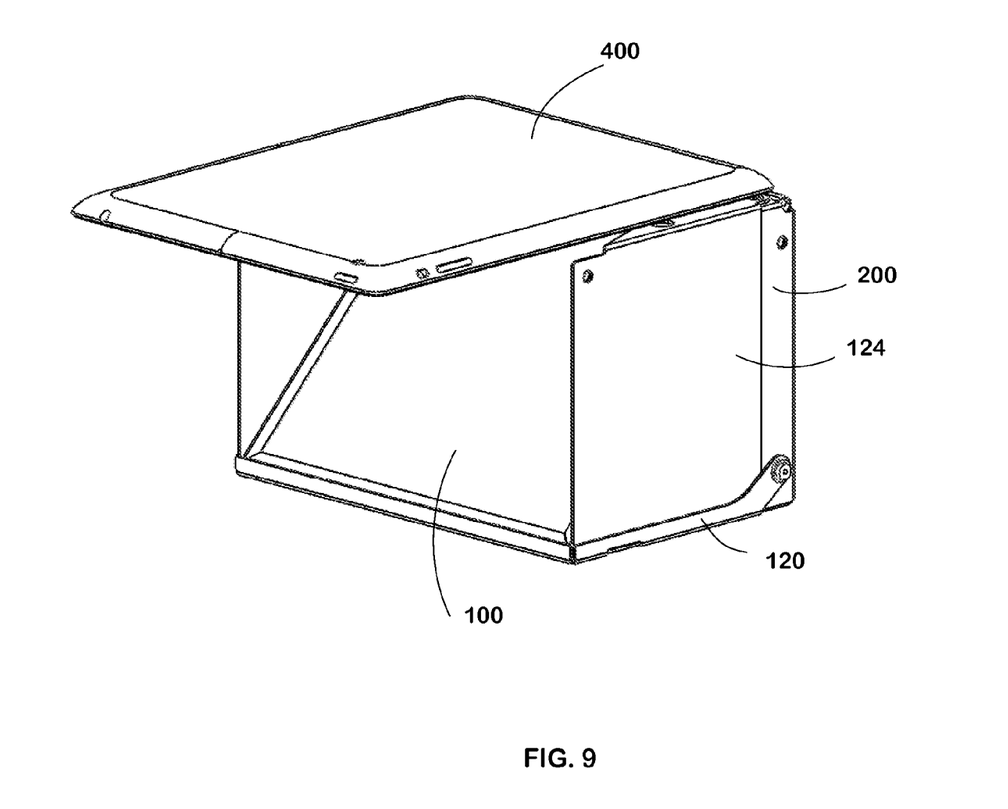
FIG. 9 is a schematic diagram illustrating a bigger size tablet being coupled with the apparatus.
Figure 10:
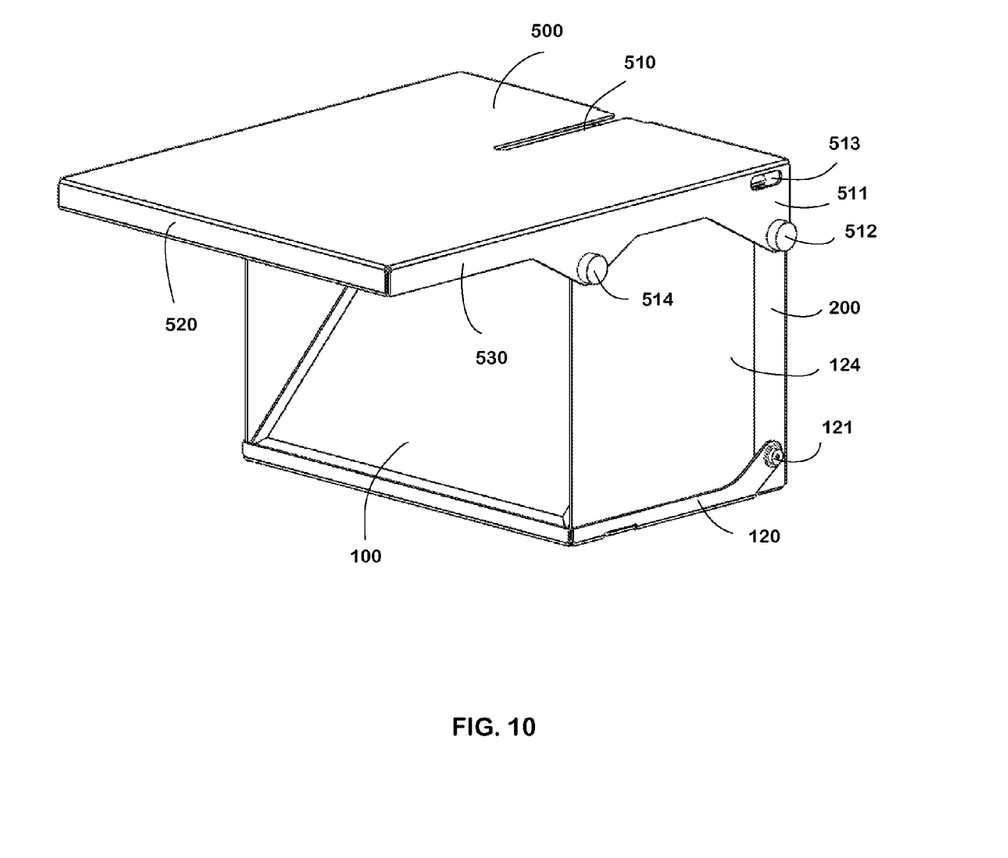
FIG. 10 is a schematic diagram illustrating the prompting apparatus with an alternative cover adaptive to the bigger size tablet for prompting.

The prompting box according to this invention may include an alternative cover for using bigger size tablet. As illustrated in FIG. 9, a bigger size tablet 400 can be used in the apparatus. The tablet's width is approximately same as, or slightly narrower than, the distance between the side walls. But its length is longer than depth of the box. The tablet 400 is placed facing down to the mirror 100. It can be fastened using the alternative cover 500 as illustrated in FIG. 10. Similar to the smaller cover 110 as illustrated in FIG. 1 and FIG. 2, the alternative cover 500 includes an adaptive slot 510 for coupling the box to a camera, an opening 513 for the user's to operate the tablet, and two pairs of fastening means such as bolts 512 and 514.

The prominent advantage of the present invention is that when apparatus is not in use, the prompting box can be easily folded into a flat compact for the user's carrying convenience.

While one or more embodiments of the present invention have been illustrated above, the skilled artisan will appreciate that modifications and adoptions to the embodiments may be made without departing from the scope and spirit of the present invention.

What is claimed is:

1. A prompting apparatus which can be coupled with a camera for video recording via a mounting and adjusting hardware assembly, comprising:
   a rectangular housing with an open front defined by a pair of symmetrical opposite side walls, a bottom, and a rear wall with a round opening for positioning and aligning said camera's lens;
   a see-through mirror being placed in said housing with its lower edge being operably coupled to said bottom's front and its upper edge being operably coupled to said side walls' upper portions such that said see-through mirror, said side walls, said bottom and said rear wall forming a chamber wherein said lens is positioned and aligned behind said see-through mirror;
   a cover operably coupled to said housing, said cover and said housing defining a space for holding a tablet device with its screen facing down at an angle of approximately 45 degrees from said see-through mirror and in operation, image on said screen is reflected by said see-through mirror to a speaker's eyes seeing into said see-through mirror while light from said speaker passes through said see-through mirror into said lens;
   wherein each of said symmetrical opposite side walls comprises a shoulder at said side wall's upper portion to support said tablet device and a joint at said side wall's rear side for coupling said side wall to said rear wall's vertical side;
   wherein said bottom has a pair of symmetrical wings located at its left and right sides, each of which comprising a joint at said wing's rear end for coupling said bottom to said rear wall's vertical side;
   wherein said cover comprises adaptive slot for coupling with said mounting and adjusting hardware assembly; and
   wherein when said cover and said see-through mirror are removed from said housing, said symmetrical opposite side walls can be folded inwardly and said bottom can be folded up such that said housing is folded into a flat compact.

2. The prompting apparatus of claim 1, wherein each of said symmetrical opposite side walls further comprises a male member at said side wall's front lower edge; wherein each of said symmetrical wings further comprises a female member at said wing's front lower edge, and wherein when said side walls are fully opened, said male member is coupled with said female member.

3. The prompting apparatus of claim 1, wherein said cover is fastened to said housing by two pair of bolts.

4. The prompting apparatus of claim 1, said cover comprises at least one opening on its side for a user's operation of said tablet device.

5. The prompting apparatus of claim 1, wherein said shoulder comprises a female member for fastening a glass connector to said side wall.

6. The prompting apparatus of claim 1, further comprises an alternative cover, said cover's inner width being approximately the same as said housing's outer width and said cover's length being longer than said housing's depth.

* * * * *